United States Patent [19]

Mochida

[11] Patent Number: 4,482,885
[45] Date of Patent: Nov. 13, 1984

[54] ALARM SYSTEM FOR AN AUTOMATIC TRANSMISSION

[75] Inventor: Haruo Mochida, Yokohama, Japan

[73] Assignee: Nissan Motor Company, Limited, Yokohama, Japan

[21] Appl. No.: 320,135

[22] Filed: Nov. 10, 1981

[30] Foreign Application Priority Data

Nov. 21, 1980 [JP] Japan ................ 55-165002

[51] Int. Cl.³ ............................................. B60Q 1/00
[52] U.S. Cl. ........................... 340/52 R; 340/52 D; 200/61.88; 200/61.91; 307/10 R
[58] Field of Search ............ 340/52 R, 52 D; 200/61.88, 61.91, 61.87; 307/10 R, 10 AT

[56] References Cited

U.S. PATENT DOCUMENTS

| | | | |
|---|---|---|---|
| 2,799,843 | 7/1957 | Savino | 340/52 D |
| 3,131,782 | 5/1964 | Freeman | 180/286 |
| 3,381,269 | 4/1968 | Fierbaugh et al. | 340/52 R |
| 3,723,968 | 3/1973 | Kelly | 340/52 D |

FOREIGN PATENT DOCUMENTS

| | | |
|---|---|---|
| 2427927 | 6/1978 | France . |
| 980692 | 1/1965 | United Kingdom . |
| 1217132 | 12/1970 | United Kingdom . |
| 1243129 | 8/1971 | United Kingdom . |
| 1319962 | 6/1973 | United Kingdom . |
| 1489899 | 10/1977 | United Kingdom . |
| 1540258 | 2/1979 | United Kingdom . |

*Primary Examiner*—Donnie L. Crosland
*Attorney, Agent, or Firm*—Schwartz, Jeffery, Schwaab, Mack, Blumenthal & Koch

[57] ABSTRACT

An alarm system for an automatic transmission includes an alarm device and two or three control switches in a serial connection. One switch closes when the transmission selector lever is not in park position; the second switch closes when a condition preparatory to leaving the vehicle, such as door opening, is detected. The third, optional switch closes when an emergency brake is not securely engaged. Thus, an alarm is generated when the driver prepares to leave the vehicle with the transmission selector lever not in the park position. Redundant switches are disclosed for the first and second switches. Also, a holding relay is disclosed which maintains the alarm until the automatic transmission selector lever is shifted into the park position, by closing a shunt across the second switch whenever the alarm is produced.

19 Claims, 8 Drawing Figures

ALARM SYSTEM FOR AN AUTOMATIC TRANSMISSION

BACKGROUND OF THE INVENTION

1. Field of the Invention

The present invention relates generally to an alarm system for an automatic transmission, and more specifically to an alarm system for producing a warning alarm when the driver prepares to leave a vehicle equipped with an automatic transmission while the automatic transmission selector lever is not fully shifted into the park position.

2. Description of the Prior Art

Generally, there has been no effective means for informing the driver that the selector lever used for the automatic transmission is perfectly shifted into the park position when the automotive vehicle is left stopped or parked.

Therefore, it frequently happens that a driver forgets to shift the transmission selector lever into the park position, or shifts the lever imperfectly into the park position without recognizing the problem, before leaving the vehicle. In some circumstances, especially when the automatic vehicle is left stopped or parked on a slope, this can lead to unexpected, and extremely dangerous, movement of the vehicle.

SUMMARY OF THE INVENTION

In view of these problems, it is the primary object of the present invention to warn the driver that the automatic transmission selector lever is not securely in the park position before the driver leaves the vehicle.

To achieve the above-mentioned object, the alarm system for an automatic transmission according to the present invention comprises at least two switches and an alarm device. The one switch monitors whether or not the selector lever for the automatic transmission is securely in the park position; the other switch monitors some condition of the passenger compartment, such as seat pressure, door opening, etc., in order to detect conditions indicating the driver is preparing to leave and closes the circuit in response to such conditions.

In more detail, the alarm system according to the present invention comprises a first control switch turned on only when the selector lever for an automatic transmission has been shifted into the selector positions other than Park position, a second control switch connected in series with the first control switch and turned on only when the driver has left the vehicle, and an alarm device connected in series with both the first and the second control switches and arranged so as to produce an alarm only when the first and second switches have both been turned on.

The above-mentioned problems can also be averted by properly setting a hand brake. Accordingly, the present invention may include a hand brake switch connected in series with the other alarm circuit elements, which opens the circuit when the hand brake is securely engaged. Thus, regardless of other conditions, the alarm device will be disabled if the hand brake is securely engaged.

Further, in order to improve reliability, redundant switches may be provided for each of the two switches of the alarm circuit.

BRIEF DESCRIPTION OF THE DRAWINGS

The features and advantages of the alarm system for an automatic transmission according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Now follows a description of preferred embodiments according to the present invention with reference to the attached drawings.

Figure 1:
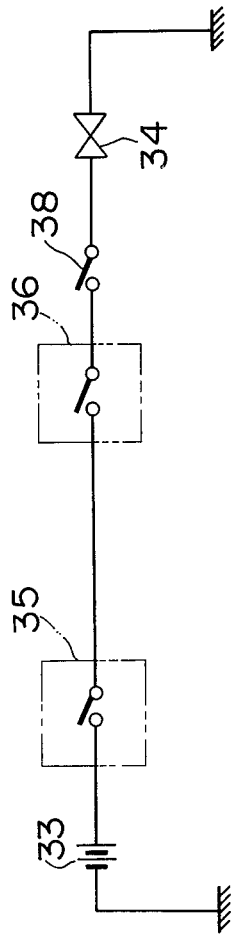
FIG. 1 is a schematic diagram of a first preferred embodiment of the alarm circuit according to the present invention.

FIG. 1 is a schematic diagram of a first preferred embodiment of the alarm circuit according to the present invention. In the figure, the numeral 33 denotes a battery and the numeral 34 denotes an alarm device, which might be a buzzer, an indicator light, or any kind or combination of audio and/or visual signal producers. Connections and grounds are provided for the battery and the alarm device in such a way that when the connections are all closed, the battery energizes the alarm device, thus causing the alarm device to produce an unmistakeable alarm. The alarm circuit also includes two control switches 35 and 36 and a hand brake switch 38. The first control switch 35 is designed to close the circuit when the automatic transmission selector lever is not in the park position as will be explained in greater detail later. The second control switch 36 is intended to close whenever the driver prepares to leave the vehicle. The condition of "preparation to leave the vehicle" can be detected in a number of ways, such as driver's seat pressure, as will be explained later in greater detail. The hand brake switch 38 is designed to close the circuit whenever the hand brake is not in a position capable of preventing movement of the vehicle. It should be noted that the hand brakes switch 38 need not be present for the alarm circuit to function as intended for the invention; rather, it serves to prevent an annoying alarm in cases where the driver must leave the vehicle or cause by other means the closing of the second control switch 36 while the automatic transmission selector lever is not in the park position.

In the first preferred embodiment of the alarm circuit, when the driver leaves the driver seat without shifting the selector lever into the park position or with the lever shifter thereinto imperfectly, the first control switch 35 and the second control switch 36 are both closed. At this moment, unless the hand brake lever is pulled upward sufficiently, since the hand brake switch 38 is kept closed, a circuit as shown in FIG. 1 is formed and the alarm device 34 is actuated, indicating to the driver that there is a possibility of the vehicle starting to move against the driver's wish. In this embodiment, when the hand brake lever is pulled upward sufficiently, since the brake switch 38 is kept opened without forming a circuit shown in FIG. 1, the alarm device 34 is not actuated. In this case, since a sufficient brake force is applied to the vehicle in order to prevent the vehicle from moving, there will be no problem.

As already described, the brake switch 38 is not necessarily needed. If no brake switch 38 is provided therefor, when the driver shifts the selector lever imperfectly or forgets to shift it thereinto before leaving the driver seat, the alarm device 34 is always actuated to produce an alarm for attracting a driver's attention.

In the basic embodiment of FIG. 1 described above, the order of connections of the first and second control switches 35 and 36, the alarm device 34, and the hand brake switch 38 is not important, and can be varied.

Figure 2:
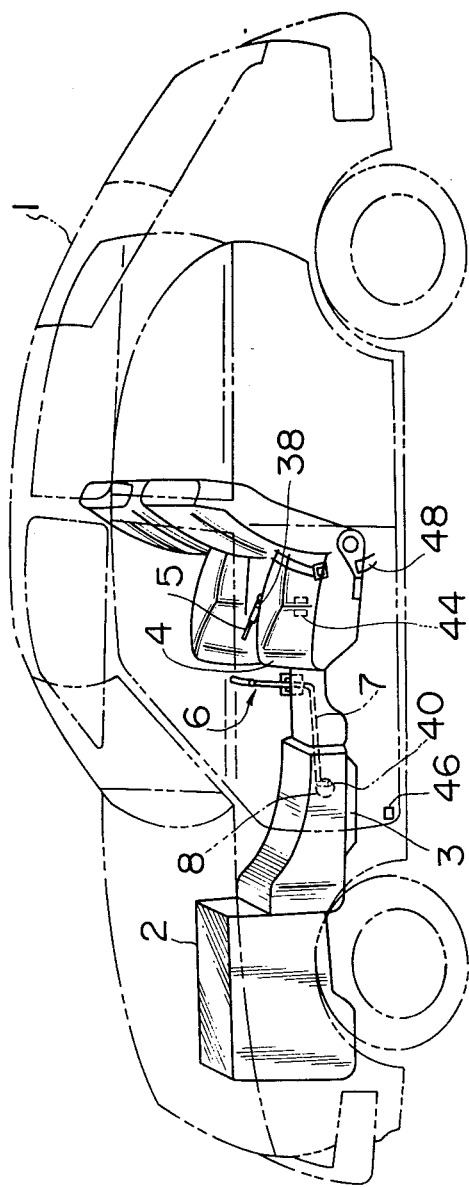
FIG. 2 is a cut-away pictorial view of the relevant portion of an automotive vehicle employing the present invention, showing the placement of a first embodiment of the first control switch and the second control switch according to the present invention.

FIG. 2 shows the relevant portion of an automotive vehicle employing the present invention, which illustrates the placement of a first embodiment of the first control switch and the second control switch according to the present invention.

There are special conditions of the passenger compartment which always occur when and only when the driver leaves. Such conditions include opening the driver's door, lack of pressure on the driver's seat, and unbuckling or unfastening the driver's seat belt. Thus, the second control switch 36 could be a normally-open door switch 46 closing when the door is open, or a normally-closed switch 44 opening when depressed by the driver's seat cushion when laden, or a seat belt switch 48 opened by fastening the driver's seat belt as shown in FIG. 2. Those skilled in the art will be able to devise many other arrangements of suitably operating switches for detecting these and other suitable conditions, such as ignition key switching.

To explain in more detail with reference to FIG. 2, as a first embodiment of the second control switch 36, it is possible to use a door switch 46 as depicted in FIG. 2. The door switch 46 is closed when the door on the driver side is opened.

In this embodiment, when the driver opens the driver-side door without shifting the selector lever into the park position perfectly, the alarm device 34 is actuated to inform the driver of a danger.

As a second embodiment of the second control switch 36, it is further possible to use a seat switch 44 as depicted in FIG. 2. The seat switch 44 is closed when the driver leaves the driver seat, being actuated by the pressure caused by driver's weight.

In this embodiment, when the driver rises up from the vehicle seat without shifting the selector lever into the park position perfectly, the alarm device 34 is actuated to inform the driver of the danger.

As a third embodiment of the second control switch 36, it is still further possible to use a seat-belt switch 48.

The seat belt switch 48 is closed when the seat belt is unfastened from the driver.

In this embodiment, when the driver leaves the vehicle after having unfastened the seat belt without shifting the selector lever into the park position perfectly, the alarm device 34 is actuated to inform the driver of a danger.

Next, three possibilities for the preferred embodiments of the first control switch 35 are described with reference to FIGS. 2 through 5. All three embodiments rely on the travel of mechanisms for transmitting the driver's gear selection to the automatic transmission.

FIG. 2 shows the portions of the passenger and engine compartments relevant to the present invention. A gear selector lever 6 can be moved by the driver through a range corresponding to the range of the gears of the automatic transmission 3. The position of the gear selector lever 6 is transmitted to the transmission 3 via a linkage member 7 and an automatic transmission actuating lever 8, so that the gear selector lever 6, the linkage member 7, and the automatic transmission actuating lever 8 can all move through a series of discrete positions corresponding to transmission gear positions, as is well-known. Since the park position most often corresponds to one extreme of the travel ranges of those three members (6, 7, 8), it is convenient to adapt switches to recognize parking gear engagement by the position of one of those members (6, 7, 8).

For example, a linkage switch 40 shown in FIG. 2 is positioned near the actuating lever 8 in such a manner that it is closed only when the actuating lever 8 is not shifted into the park position. The linkage member 7 could be used in the same way as the actuating lever 8. Two other embodiments of the first control switch 35 employing the gear selector lever 6 are illustrated in FIGS. 3 through 5.

By way of illustration, FIG. 2 also shows a typical hand brake lever 5 in the engaged position. During vehicle travel the hand brake lever 5 will be released and lowered between the passenger seats. As shown, the hand brake is engaged by raising the hand brake lever 5 fully. The hand brake switch 38 can be a normally-closed switch positioned under the hand brake lever 5 near its pivotal point and will always be open when the hand brake is engaged fully.

Figure 3:
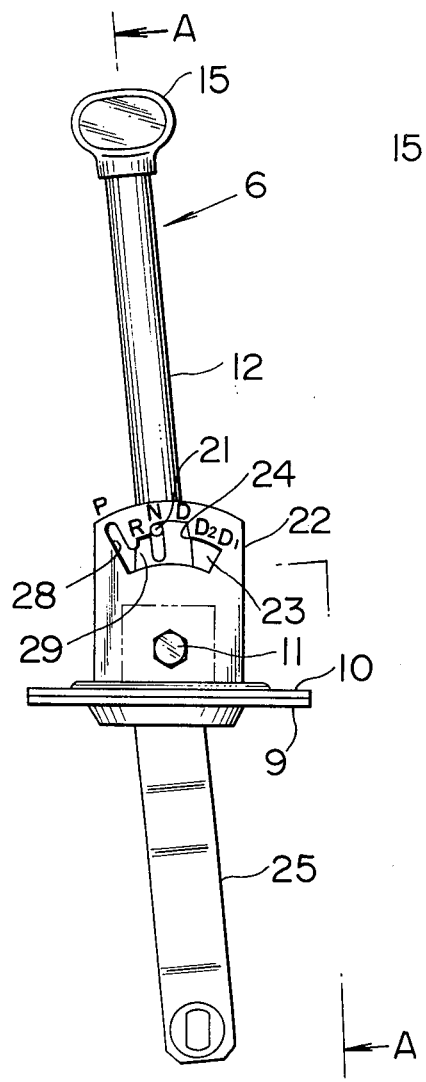
FIG. 3 is a side view of a gear selector lever employing a second embodiment of the first control switch according to the present invention.
Figure 4:
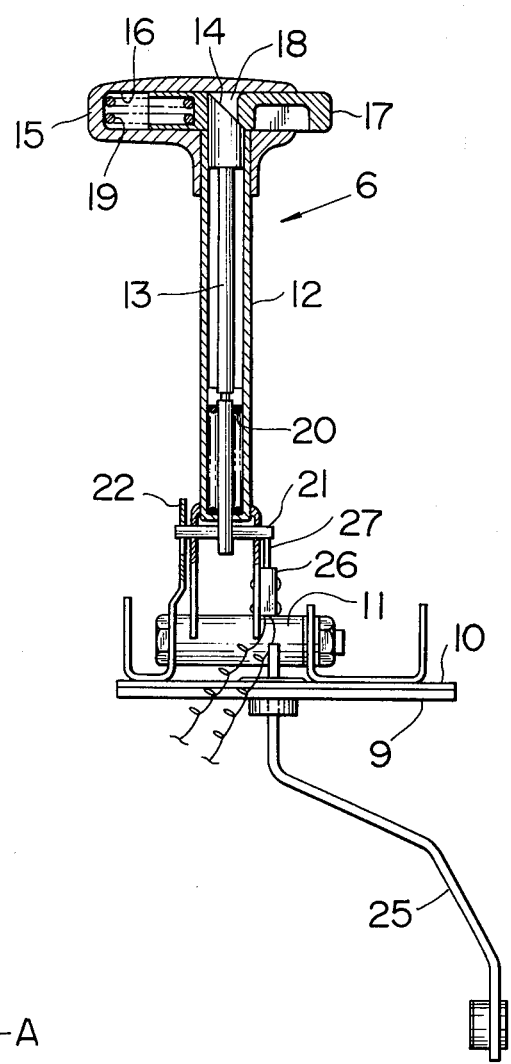
FIG. 4 is a front partial-section view of the gear selector lever of FIG. 3, taken along the lines A—A.
Figure 5:
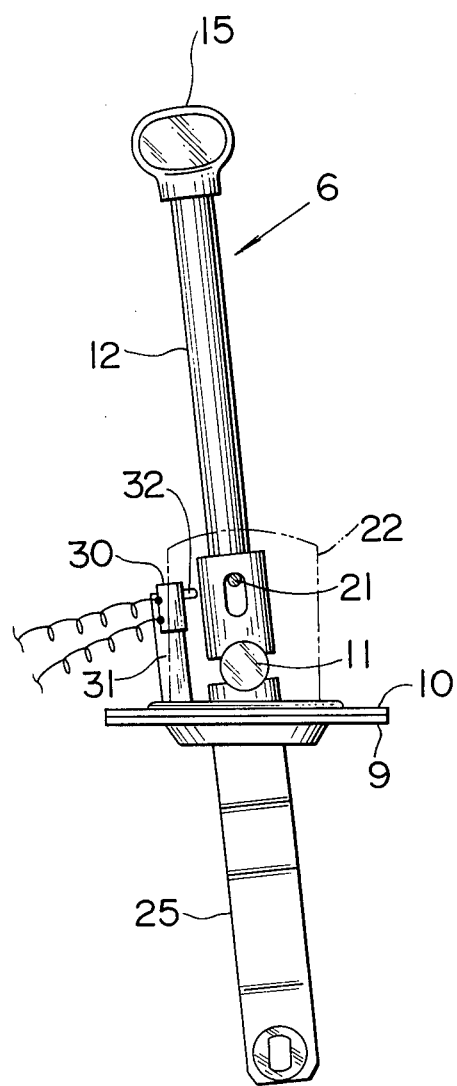
FIG. 5 is a side view of a gear selector lever employing a third embodiment of the first control switch according to the present invention.

FIGS. 3 and 4 show a second embodiment of the first control switch according to the present invention; that is, a pin-actuated selector switch 26.

In these figures, the reference numeral 12 denotes a lever body of the selector lever 6. The lever body 12 is mounted on an axle 11 rotatably supported by a selector lever bracket 10 fixed to the car body 9. A rod 13 is slidably inserted into the lever body 12, and an inclined portion 14 is formed on the top of the rod 13. The reference numeral 15 denotes a lever handle fixed onto the top of the lever body 12. A bore 16 extending in the direction perpendicular to the rod 13 is formed in the lever handle 15; a plunger button 17 is slidably inserted into the bore 16; and an inner end surface 18 possible to be brought into contact with the inclined portion 14 is formed in the plunger button 17. The reference numeral 19 denotes a spring inserted into the bore 16, which urges the push button rightward when seen in the figure. Also, another spring 20 is so housed within the lever body 12 as to urge the rod 13 upward. The reference numeral 21 denotes a position pin disposed under the rod 13, which is urged upward into contact with the contact surface 24 of a cut-out 23 formed in a position plate 22 by the spring 20, as depicted in FIG. 3. On the contact surface 24 of the cut-out 23, there are provided various selector lever position marks such as $D_1$, $D_2$, D, N, R and P, in which $D_1$ indicates First, $D_2$ indicates Second, D indicates Drive, N indicates Neutral, R indicates Reverse, and P indicates Park. Further, in the figure, the reference numeral 25 denotes an extension lever one end of which is linked with the axle 11 and the other end of which is linked with the actuating lever 8 of the automatic transmission 3 through a linkage member 7.

The reference numeral 26 denotes a pin-actuated selector microswitch including a switch arm 27, which is fixed on the lever body 12 directly under the position pin 21 so as to be depressed in most positions except the park position by the position pin 21. In order to detect whether or not the selector lever 6 is shifted securely into the park position, the contact slot 28 formed in the cut-out 23 in the park plate 22 is formed more deeply compared with a projection 29 and the other contact surfaces 24 of other positions, so that the switch arm 27 of the microswitch 26 can be separated from the position pin 21 only when the selector lever is set securely to the park position in order to open the microswitch 26.

In the second embodiment thus constructed, the lever body 12 pivots about an axle 11 fixed in a bracket 10 mounted on the car body 9. A rod 13 extends through the lever body 12 and has an inclined portion 14 at the top, within a bore 16 of a lever handle 15. A plunger button 17 slidably disposed within the bore 16 has an inner end surface 18 canted to mate with the inclined portion 14 of the lever rod 13. Thus, by pushing the plunger button 17 inward against the force of a spring 19, the lever rod 13 is pushed down against the force of a spring 20. Near the bottom of the lever rod 13 is a position pin 21 which extends through a cut-out 23 in a position selecting plate 22. The contact surface 24 of the plate 22 defines the limits of the cut-out 23, and the limits of movement of the position pin 21 and, therefore, of the gear selector lever 6. An extension lever 25 opposite the axle 11 from the gear selector lever 6 transmits the position of the gear selector lever 6 to a linkage member (not shown) such that discrete positions defined in the contact surfaces 24 of the position selecting plate 22 correspond to discrete gears of the automatic transmission (not shown).

With such a gear selector lever mechanism 6, a selector switch as the first control switch can be actuated by either the position pin 21 or the lever body 12. For instance, FIG. 4 shows a microswitch 26 with a switch arm 27 actuated by the position pin 21. The microswitch 26 is mounted in such a way that the switch arm 27 is depressed only when the position pin 21 is in the park position defined by the contact slot 28 and the projection 29. The microswitch 26 will be normally closed, so that it opens the circuit only when the automatic transmission is in the park position correctly.

FIG. 5 shows the third embodiment of the first control switch according to the present invention; that is, a body-actuated selector switch 30.

The selector switch can also detect whether or not the lever body 12 is shifted securely into the park position. In the figure, the reference numeral 30 denotes a body-actuated selector microswitch, which is mounted on a bracket 31 fixed to a selector lever bracket 10 and the switch arm 32 which is brought into contact with the bottom side surface of the lever body 12. That is to say, only when the selector lever 6 is securely shifted into the park position, the switch arm 32 is brought into contact with the lever body 12 to open the selector switch 30. When the selector lever 6 is set to the positions other than the park position, the switch arm 32 is kept apart from the lever body 12 to close the selector switch 30.

In the manner described above, this embodiment can achieve the same effect as those described already.

Figure 6:
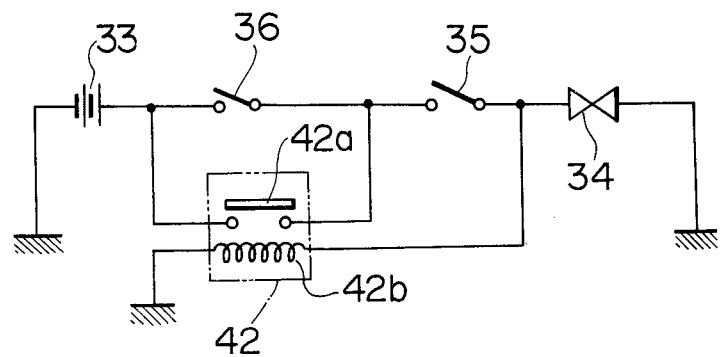
FIG. 6 is a schematic diagram of a second preferred embodiment of the alarm circuit according to the present invention.

FIG. 6 shows the second preferred embodiment of the alarm circuit according to the present invention.

In the figure, the reference numeral 33 denotes a power supply, to which the first control switch 35, the second control switch 36, and the alarm device 34 are all connected in series. In this embodiment, once the first and second control switches 35 and 36 are both closed, even when the second control switch 36 is opened thereafter, if the selector lever 6 is not shifted into the park position, securely to open the first control switch 35; that is, if the switch 35 is remains closed, a current continues to pass through the alarm device 34 from the power supply 33 to activate the alarm device 34.

This alarm circuit additionally includes a holding relay 42. The holding relay 42 comprises movable contacts 42a connected in parallel with the second control switch 36 to act as a shunt switch and a relay coil 42b connected in series with the first and second control switches 35 and 36. When the relay coil 42b is energized by closing the two control switches 35 and 36, the magnetic field generated by the coil causes the movable contacts 42a to contact, i.e. to close the circuit around the second control switch 36 (door switch, seat switch, etc.). In this case, even if the second control switch 36 opens, the alarm will continue to be produced until the first control switch 35 is opened, i.e. until the automatic transmission selector lever is securely in the park position. This "persistence" feature will make it more difficult for the driver to ignore the alarm warning.

As in the first alarm circuit embodiment, the hand brake switch 38 may be included in the alarm circuit for greater functional flexibility.

Figure 7:
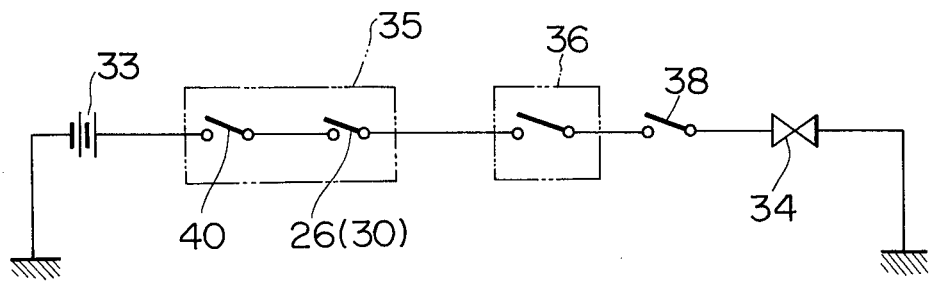
FIG. 7 is a schematic diagram of a third preferred embodiment of the alarm circuit according to the present invention.

FIG. 7 shows a third preferred embodiment of the alarm circuit according to the present invention. In this embodiment, the first control switch 35 comprises two separate switches in series for greater reliability. These switches may be any combination of the linkage switch 40 and the pin-actuated selector switch 26 and/or the body-actuated selector switch 30 or other possible switches which close when the selector lever 6 in not in park position. FIG. 7 shows the linkage switch 40 in series with either selector switch (26, 30), but both selector switches might be used. This embodiment has the advantage that if one of the switches of the first control switch should fail to open when the automatic transmission is in the park position, the other will prevent an annoying and misleading alarm.

In this embodiment, since the linkage switch 40 adjusted so as to be actuated in response to the movement of the actuating lever 8 of the automatic transmission and the selector switch adjusted so as to be actuated in response to the movement of the select lever are connected in series as the control switch, even when there is a small mutual positioning error between the selector lever 6 and the actuating lever 8, it is possible to securely detect the state where the selector lever is not shifted into the park position securely.

Figure 8:
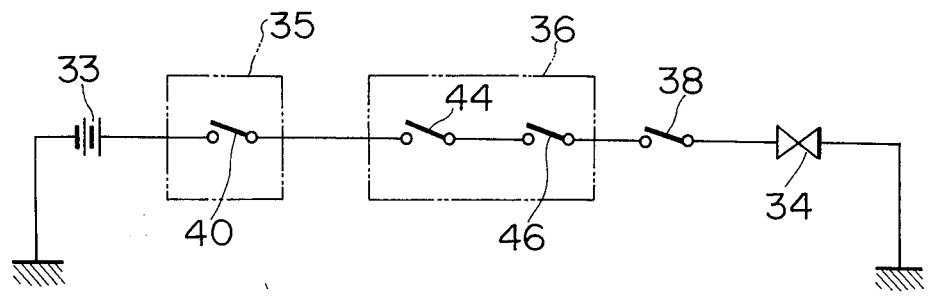
FIG. 8 is a schematic diagram of a fourth preferred embodiment of the alarm circuit according to the present invention.

FIG. 8 shows a fourth preferred embodiment of the alarm circuit according to the present invention. In this instance, the second control switch 36 comprises two separate switches 44 and 46 in series for added reliability. These switches might be any combination of a seat switch 44, a door switch 46, or a seat belt switch 48, as described previously or other possible switches which close when the driver prepares to leave the vehicle. As in the case of the third embodiment, if one of the switches of the second control switch should fail to open, the other will open to prevent an irrelevant alarm.

FIGS. 7 and 8 show a hand brake switch 38 included in the alarm circuits of the third and fourth alarm circuit embodiments. However, it should be recognized that the hand brake switch 38 can also be omitted without disrupting the operation of the alarm circuit according to the present invention.

As described above, according to the present invention, since the alarm system for an automotive transmission comprises a first control switch turned on when the selector lever of the automatic transmission is not shifted into the park positions correctly, a second control switch connected in series with the first control switch and turned on when the driver leaves the driver seat, and an alarm device connected in series with the second control switch and actuated to produce an alarm when the first and the second control switches are both turned on, it is possible to inform the driver securely of the state where the selector lever is not shifted into the park position perfectly.

It will be understood by those skilled in the art that the foregoing description is in terms of preferred embodiments of the present invention wherein various changes and modifications may be made without departing from the spirit and scope of the invention, as is set forth in the appended claim.

PARTS LIST

3 . . . Automatic transmission
5 . . . Hand brake lever
6 . . . Gear selector lever
12 . . . Gear selector lever body
21 . . . Position pin
26 . . . Pin-actuated selector switch
30 . . . Body-actuated selector switch
34 . . . Alarm device
35 . . . First control switch
36 . . . Second control switch
38 . . . Third control switch (Hand brake switch)
40 . . . Linkage switch
42 . . . Holding relay
44 . . . Seat switch
46 . . . Door switch
48 . . . Seat belt switch

What is claimed is:

1. An alarm system for an automotive vehicle provided with an automatic transmission including a gear selector lever having a park position, said system comprising:
   (a) a first control system positioned to close when the gear selector lever is set to a position other than the park position;
   (b) a second control switch positioned to close when a driver leaves the automotive vehicle;
   (c) an alarm device connected in series with said first and second control switches for producing an alarm when both of said control switches are closed; and
   (d) a third control switch connected in series with said alarm device and said first and second control switches, which closes when a hand brake is not in a condition of complete engagement.

2. An alarm system for an automotive vehicle according to claim 1, wherein said first control switch is a linkage switch positioned near an actuating lever of the automatic transmission in such a way that said linkage switch is closed whenever the actuating lever is set to a position other than the park position.

3. An alarm system for an automotive vehicle according to claim 1, wherein said first control switch is a pin-actuated selector switch positioned at the side of the gear selector lever of the automotive transmission in such a way that the selector switch is closed whenever the gear selector lever is set to a position other than the park position, said selector switch being actuated by a position pin fixed to the selector lever.

4. An alarm system for an automotive vehicle according to claim 1, wherein said first control switch is a body-actuated selector switch positioned near the stroke end of the gear selector lever of the automotive transmission in such a way that the selector switch is closed whenever the gear selector lever is set to a position other than the park position, said selector switch being acutated by a selector lever body.

5. An alarm system for an automotive vehicle according to claim 1, wherein said second constrol switch is a pressure-sensitive normally-closed seat switch disposed under the driver's seat, which closes when weight commensurate to a human body is not in the driver's seat.

6. An alarm system for an automotive vehicle according to claim 1, wherein said second control switch is a door switch which closes when the driver's door is opened.

7. An alarm system for an automotive vehicle according to claim 1, wherein said second control switch is a seat-belt switch which closes when the driver's seat belt is unfastened.

8. An alarm system for an automotive vehicle according to claim 1, wherein said alarm device is a buzzer.

9. An alarm system for an automotive vehicle according to claim 1, wherein said alarm device is an indicator light.

10. An alarm system for an automotive vehicle according to claim 1, wherein said alarm device is a combination of a buzzer and an indicator light.

11. An alarm system for an automotive vehicle provided with an automatic transmission including a gear selector lever having a park position, said system comprising:
   (a) a first control system positioned to close when the gear selector level is set to a position other than the park position;
   (b) a second control switch positioned to close when a driver leaves the automotive vehicle;
   (c) an alarm device connected in series with said first and second control switches for producing an alarm when both of said control switches are closed; and
   (d) a holding relay which includes:
   a shunt switch connected in parallel with said second switch; and
   a relay coil connected in series with said first and second control switches,
   whereby said holding relay serves to close the shunt switch when said first and second control switches are both closed, in order that the alarm device keeps producing an alarm until said first control switch is opened even when said second control switch is opened.

12. An alarm system for an automotive vehicle provided with an automatic transmission including a gear selector lever having a park position, said system comprising:
    (a) a first control system positioned to close when the gear selector lever is set to a position other than the park position;
    (b) a second control switch positioned to close when a driver leaves the automotive vehicle; and
    (c) an alarm device connected in series with said first and second control switches for producing an alarm when both of said control switches are closed, wherein said first control switch comprises two switches in series, each of which closes when the gear selector lever is set to a position other than the park position, and said two switches being actuated in different manners by the automatic transmission, whereby failure of either switch does not cause an inappropriate alarm.

13. An alarm system for an automotive vehicle according to claim 12, wherein said first control switch comprises a linkage switch and a pin-actuated selector switch.

14. An alarm system for an automotive vehicle according to claim 12, wherein said first control switch comprises a linkage switch and a body actuated selector switch.

15. An alarm system for an automotive vehicle provided with an automatic transmission including a gear selector lever having a park position, said system comprising:
    (a) a first control system positioned to close when the gear selector lever is set to a position other than the park position;
    (b) a second control switch positioned to close when a driver leaves the automotive vehicle; and
    (c) an alarm device connected in series with said first and second control switches for producing an alarm when both of said control switches are closed, wherein said second control switch comprises two switches in series, each of which closes when the driver leaves the vehicle, and said two switches being actuated in different manners, whereby failure of either switch does not cause an inappropriate alarm.

16. An alarm system for an automotive vehicle according to claim 15, wherein said second control switch comprises a pressure-sensitive seat switch and a door switch.

17. An alarm system for an automotive vehicle according to claim 15, wherein said second control switch comprises a pressure-sensitive seat switch and a seat-belt switch.

18. An alarm system for an automotive vehicle according to claim 15, wherein said second control switch comprises a door switch and a seat-belt switch.

19. An alarm system for an automotive vehicle provided with an automatic transmission including a gear selector lever and with a hand brake, said system comprising:
    (a) a first control switch which closes when the gear selector lever is set to a position other than park position;
    (b) a second control switch which closes when the driver leaves the automotive vehicle;
    (c) a third control switch which closes when the hand brake is not in a condition of complete engagement; and
    (d) an alarm device connected in series with said first, second and third control switches for producing an alarm when all of said control switches are closed.

* * * * *